March 4, 1958 W. V. PORTER 2,825,276
PIPELINE VENT CAP AND ARRANGEMENT
Filed Oct. 25, 1956
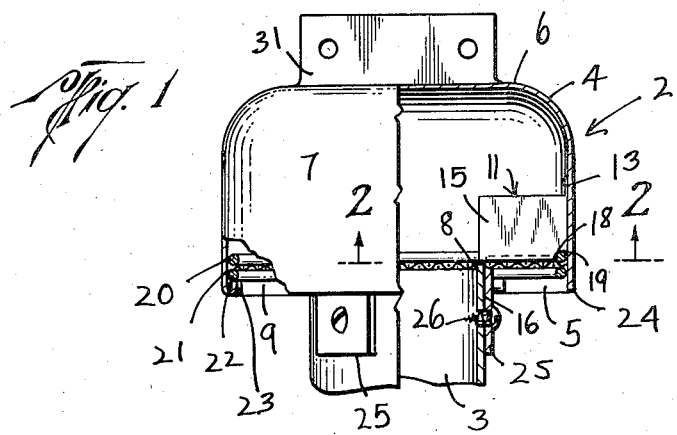
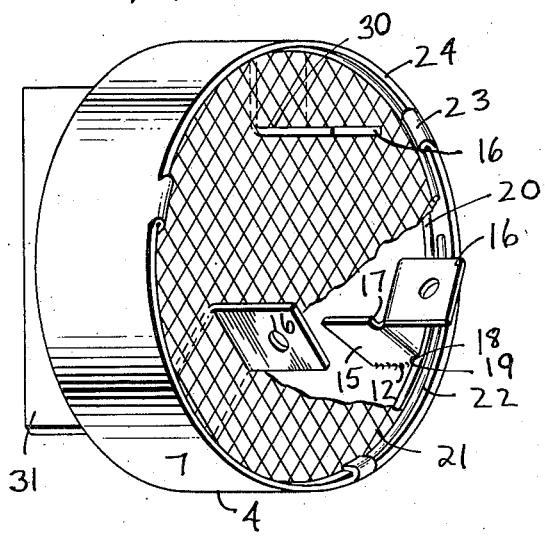
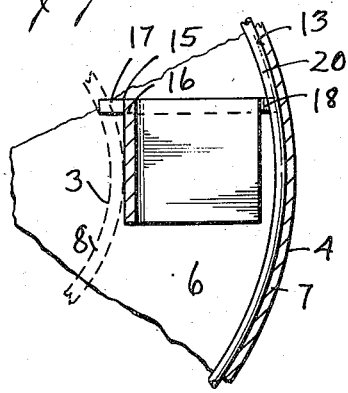
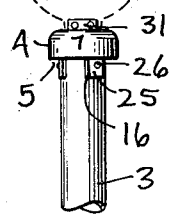
William V. Porter
INVENTOR.
BY Hayden & Pravel
ATTORNEYS

United States Patent Office 2,825,276
Patented Mar. 4, 1958

2,825,276

PIPELINE VENT CAP AND ARRANGEMENT

William V. Porter, San Antonio, Tex., assignor to The Porter Company, a division of Houston Porcelain Enameling Company, a corporation of Texas Application October 25, 1956, Serial No. 618,315

2 Claims. (Cl. 98—122)

The present invention relates to a vent cap construction and more particularly to a vent cap adapted to be used in connection with transmission lines which convey oil, gas and the like.

Transmission lines for conducting oil, gas or other substances cross underneath roads at intervals throughout their length.

To inhibit damage to the pipeline due to passage of vehicles on the road over the pipeline, and to reduce the possibility of explosion or fire in the pipeline under the roadway, and to provide, in general, a safe arrangement for protecting the pipe where it crosses the roadway, it is customary to enclose the pipeline in a larger casing, which casing surrounds the pipeline and extends along the pipeline for the full width of the road and a suitable distance on each side thereof.

It is also desirable to vent the annular space between the pipeline and the surrounding casing to the open air so as to avoid the collection of any gaseous mixture in the annulus between the pipeline and the casing which surrounds it that might encourage combustion or an explosion.

Various devices have been proposed and heretofore used for venting the annular space between the casing and the pipeline, but all of such constructions have been cumbersome and in general provide no arrangement for inhibiting the entry of animals into the vent pipe, which animals may become stuck in the vent pipe or build nests in the vent pipe and thereby close off or reduce the effectiveness of the venting arrangement between the atmosphere and the annular space. Additionally, the devices presently in use are not readily adaptable to various size vent pipes and it is therefore necessary to fabricate or custom-make each vent pipe for the pipeline. It can be appreciated that where the pipeline crosses roads numerous times throughout its length, the attendant expenditure and loss of time in providing vent pipes for the pipelines is very great.

The present invention provides a vent cap arrangement for venting the annular space around a pipeline where it passes beneath a roadway, which vent cap overcomes the objections of those heretofore used.

Still another object of the invention is to provide a vent cap construction, including bracket means whereby the vent cap may be quickly and easily fitted to any size vent pipe.

Still another object of the present invention is to provide a vent cap construction including a cylinder open at one end, and a bracket engaged with the vent cap and including seating arrangements thereon for resting on top of the vent pipe to support the vent cap thereon and for removably positioning a screen over the open end of a cylinder for inhibiting the entry of animals and birds thereinto.

Still a further object of the invention is to provide a vent cap including a screen which is removably positioned thereon, there being means for retaining the screen in position during use, but which permit easy and ready removal of the screen for cleaning thereof, and a bracket for securing the vent cap in position on a vent pipe.

Other objects and advantages of the invention will become more readily apparent from a consideration of the following description and drawings wherein:

Fig. 1 is a quarter-sectional view illustrating the details of construction of the present invention;

Fig. 2 is a sectional view on the line 2—2 of Fig. 1 showing the arrangement of the bracket means and its relationship to the vent cap and the vent pipe;

Fig. 3 is a perspective view illustrating the screen or foraminated fabric in position on the open end of the vent cap and the bracket means at circumferentially spaced intervals on the vent cap; and Fig. 4 is an elevational view showing the vent cap of the present invention positioned on a vent pipe.

Attention is directed to Fig. 1 of the drawings wherein the invention is illustrated generally by the numeral 2. The venting arrangement is particularly adapted for use with transmission lines which convey oil, gas other material therethrough, and, of course, it may be used in other situations if desired. It will be noted that the tubular member 3 extends upwardly from the ground as illustrated in Figs. 1 and 4 of the drawings which tubular member is adapted to be secured at its lower end to the casing which surrounds the pipeline whereby it communicates the annular space between such casing and the pipeline passing therethrough to the atmosphere.

A cap 4 is provided, which cap may be in the cylindrical form as illustrated in the drawings, with the open end 5 and including the closed end or top 6 with the sides 7 depending therefrom. It is desirable that the cap be of suitable size so that when it is positioned over the upper end 8 of the tubular member 3, the sides 7 will be radially spaced from the member 3 as shown in Fig. 1 of the drawings so that a relatively large opening area 9 is provided for the venting of the annular space between the pipeline and the casing to the atmosphere.

It is, of course, desirable to provide a construction and arrangement which is sturdy and will withstand the weather over an extended period of time, and, if desired, the cap may be coated with suitable substance such as porcelain enamel to combat the deleterious effects of weather which would normally occur on a common metal cap.

Additionally, it is desirable to provide a construction and arrangement which can be readily assembled and positioned on the tubular member 3. To aid in accomplishing this result, a bracket means indicated generally by the numeral 11 is provided whereby the cap may be supported over the upper end 8 of the tubular member 3. The bracket means 11 spans the distance between the sides 7 of the cap 4 and the tubular member 3 and may be secured by any suitable means such as weld 12 or the like to the inside surface 13 of the side 7 of cap 4. The brackets 11 may be arranged at desirable circumferentially spaced points about the cap 4 as illustrated in Fig. 3 of the drawing, and while three brackets 11 are illustrated in the drawings, any suitable number may be used to accomplish the desired results.

The bracket means 11 includes the vertically arranged arm 15 and a portion 16 downwardly extending relative to arm 15. The arm 15 and portion 16 may be integrally formed, or may be secured together at their juncture by any suitable means such as welds or the like. The arm 15 extends beyond the depending portion 16 so as to form a seat 17 at the innermost edge of bracket 11 whereby the cap 4 may be supported on the upper end 8 of the tubular member 3.

It is to be noted that a second seat 18 is formed at the outermost edge of the bracket 11, which seat is formed by the undercut or groove 19 in the vertical arm 15 of the bracket 11 and is adapted to receive the split retainer ring 20 therein. The split retainer ring 20 provides a support surface or shoulder for supporting the foraminated fabric 21, which may be in the form of metal screen, or positioning the metal screen 21 over the open end 5 of the cap 4. To aid in maintaining the foraminated fabric 21 in position, a second split ring retainer 22 is provided which abuts against the foraminated fabric on the side opposite from the retainer ring 20 and engages the foraminated fabric 21 between the retainer rings 20 and 22. A plurality of circumferentially spaced projections 23 are provided on the lower edge 24 of the wall 7 which engage the split ring 22 to maintain it in position.

The downwardly depending portions 16 of the bracket 11 are adapted to fit about the tubular member 3 as illustrated at 25 in Fig. 1 of the drawings and it provides a surface which may be secured to the tubular member 3 by any suitable means such as screws 26. If desired, the screws 26 may be eliminated and the portion 16 welded to the member 3.

It can be readily appreciated that the length of the arm 15 of the bracket 11 may be changed so as to adapt the present invention on a tubular member 3 of any suitable diameter. When the diameter of the member 3 is smaller, then the length of the arm 15 of the bracket 11 will be greater so as to span the increased distance between the wall 7 of the cap 4 and the tubular member 3. Similarly, when the tubular member 3 is larger, the portion 15 of the bracket 11 is made shorter so as to accommodate the larger diameter tubular member 3.

In assembling the present invention, the brackets 11 may each be secured adjacent the outermost edge of the arm 15 by suitable means such as welds to the inner wall 13 of the cap 4. The split in retainer ring 20 allows such ring to be deformed so that it may be positioned in the seat 18. The inherent resiliency of such ring causes it to assume its normal shape when positioned in seat 18 so that the foraminated fabric 21 such as metal screen may be seated thereon. The retainer ring 22 is then deformed and inserted in position in like manner so as to engage it beneath the projections 23. The rings 20 and 22 are thereby each held in place and the metal screen is held in place between the rings. Of course, the metal screen 21 is provided with suitable openings as illustrated at 30 whereby the downwardly depending portions 16 of each bracket 11 may extend therethrough for engagement with the upper end of the tubular member 3. It is to be noted that the bracket means 11 is recessed within the cap 4 relative to the lower edge 24 thereof so that the cap 4 is supported over the tubular member 3 in a telescoped relationship. That is, the lower end or lower edge 24 of the cap extends below the upper end 8 of the tubular member 3. This aids in inhibiting the entry of water to the vent pipe 3 from a blowing rain or other similar weather disturbance. Also, the screen 21 prevents the entry of animals such as may be encountered like birds, armadillos, rodents, etc., which may attempt to otherwise enter the vent pipe 3 or might otherwise build their nests within the pipe 3 and thereby clog the vent pipe or reduce its effectiveness. It should be noted that the present invention provides a construction wherein the metal screen 21 may be easily removed from its position in the vent cap for cleaning thereof if desired.

Additionally, a bracket 31 may be provided on the top 6 of the vent cap for receiving a suitable sign or advertising media as illustrated at 32.

Broadly the invention relates to a vent cap construction and arrangement which may be quickly and easily assembled and placed in operation and disassembled for cleaning if desired.

What is claimed is:

1. A venting arrangement for oil and gas pipe lines comprising a tubular member extending upwardly from the ground in which the pipe line is buried, a hollow cap over the upper end of said tubular member, said cap including a top and sides depending therefrom, said sides being radially spaced from said tubular member and terminating at a point below the upper end of said tubular member, bracket means secured to said cap at circumferentially spaced points and spanning between said cap and the upper end of said tubular member and forming a seat at the innermost end to support said cap over the upper end of said tubular member, said bracket means including a downward projection for fitting about the upper end of said tubular member whereby said bracket and tubular member may be secured together for holding the cap thereon, there being a cutaway portion adjacent the outermost end of each of said bracket means which in cooperation with the inner surface of said cap forms a seat, a retainer ring positioned in said last mentioned seat, a foraminated fabric covering the end of said cap adjacent the upper end of said tubular member and resting on said retainer ring, and a second retainer ring on said foraminated fabric and in opposed relation to said first mentioned retainer ring, said cap sides having circumferential portions extending up into said cap to engage said second retainer ring to hold it in position.

2. A venting arrangement for oil and gas pipe lines comprising a tubular member extending upwardly from the ground in which the pipe line is buried, a cylindrical cap open at only one end and telescopically positioned over the upper end of said tubular member with the open end of said cap facing downward, said cap being larger in diameter than the pipe whereby said cap is radially spaced from said tubular member, bracket means circumferentially positioned inside of said cap and spanning between said cap and tubular member, said bracket means including a seat at the innermost end thereof for supporting said cap over the upper end of said tubular member whereby said cap extends below the upper end of said tubular member, a second seat on said bracket means at the outermost end adjacent said cap, a retainer ring seated in said second seat, a metal screen on said ring and covering the open end of said cap, a second retainer ring abutting said screen and holding it between said two retainer rings, circumferential projections on said cap engaging said second retainer ring to hold it in position, said bracket means including depending portions extending down through said screen for fitting about said tubular member, and means engaging said depending portions and tubular member together.

References Cited in the file of this patent

UNITED STATES PATENTS 2,210,996    Woods _____ Aug. 13, 1940